United States Patent [19]

Miller et al.

[11] Patent Number: 4,892,788

[45] Date of Patent: Jan. 9, 1990

[54] GRAPHITE BRAZING FIXTURE COATED WITH COMPOSITE LAYERS OF TITANIUM CARBIDE AND TITANIUM NITRIDE

[75] Inventors: Michael B. Miller, DeSoto, Tex.; Robert D. Bertin, Foster City, Calif.

[73] Assignee: Air Products and Chemicals, Inc., Allentown, Pa.

[21] Appl. No.: 173,957

[22] Filed: Mar. 28, 1988

[51] Int. Cl.⁴ .............................................. B32B 7/00
[52] U.S. Cl. .................................... 428/336; 428/408; 428/698; 428/699; 427/255.2
[58] Field of Search ............... 428/408, 698, 699, 336; 148/6

[56] References Cited

U.S. PATENT DOCUMENTS

| | | | |
|---|---|---|---|
| 3,684,585 | 8/1972 | Stroup et al. | 148/6 |
| 3,874,900 | 4/1975 | Post et al. | 117/69 |
| 4,565,747 | 1/1986 | Nakae et al. | 428/698 |

*Primary Examiner*—George F. Lesmes
*Assistant Examiner*—Dean R. Cornstubble
*Attorney, Agent, or Firm*—Keith D. Gourley; James C. Simmons; William F. Marsh

[57] ABSTRACT

A brazing fixture for use in the electronics industry which resists adherence of brazing compounds and insulative materials during the brazing operation and a method for making and using the same. The fixture is characterized in that it is made from a graphite substrate coated with a composite layer of titanium carbide and titanium nitride.

7 Claims, 1 Drawing Sheet

GRAPHITE BRAZING FIXTURE COATED WITH COMPOSITE LAYERS OF TITANIUM CARBIDE AND TITANIUM NITRIDE

TECHNICAL FIELD OF THE INVENTION

The present invention relates to a graphite fixture coated with a composite of titanium carbide and titanium nitride which resists adherence to brazing compounds and insulative joining materials.

BACKGROUND OF THE INVENTION

In the assembly of electronic components, typified by, but not limited to vacuum tubes, a common step is the sealing of a glass or metalized ceramic "tube" or enclosure to a metal or metalized ceramic base. The sealing or brazing operation is typically accomplished in a high temperature furnace with the components to be joined being held in position by a fixture. A primary requirement of the fixturing material is that the brazing compound or insulative material used to join the two components must not adhere to the fixture.

In the past, suitable fixtures were fabricated from graphite and stainless steel with the choice of material being dependent upon the atmosphere used in the high temperature furnace. Stainless steel fixtures are most commonly used in a furnace atmosphere of hydrogen containing trace amounts of moisture. Moisture reacts to form a passive oxide coating on the stainless steel surface to which the brazing compound or insulative material will not adhere. However, when brazing under vacuum or in a dry hydrogen atmosphere the oxide layer does not form and the brazing compound or joining material tends to adhere to the stainless steel fixture thus making it difficult if not impossible to remove the assembled electronic component.

While most brazing compounds do not readily adhere to graphite fixtures, use of such fixtures in the electronics industry has not been accepted because the material readily generates particulates which can contaminate the components to be joined and/or the joining material. Moreover, residual oxygen within the furnace atmosphere causes rapid degradation of graphite and reduces the useful lifetime of the fixture.

Many uses have been found for composite coated articles. For example, U.S. Pat. No. 3,874,900, assigned to Materials Technology Corporation, a subsidiary of Air Products and Chemicals, Inc., discloses heated substrates coated by successive vapor deposition of titanium carbide and titanium nitride. These multi-layer composites serve as coatings for metal and composite metal parts such as tools, dies and the like and are designed to reduce wear of the work surfaces.

U.S. Pat. No. 4,565,747 teaches vapor deposition of boron nitride containing from about 0.05 to 10 wt % titanium nitride. Example 7 teaches the preparation of a triple-layer composite ceramic body wherein graphite is coated with boron nitride containing titanium nitride. These composites are employed as heat resistant materials in high temperature service or as materials for use in manufacturing metallic or semiconductor articles.

BRIEF SUMMARY OF THE INVENTION

The present invention relates to a graphite fixture successively coated by vapor phase deposition with titanium carbide and titanium nitride which resists adherence to brazing compounds and insulating materials and a method for making and using the same. Fixtures according to the present invention are made from a graphite substrate having at least one surface which is coated with a composite coating. The composite coating includes a first layer of titanium carbide and a second layer of titanium nitride overlaying said first layer of titanium carbide. Typically, the titanium carbide layer has a thickness of from about 0.0001–0.0003 inches and the titanium nitride layer has a thickness of from about 0.0003–0.0005 inches.

The method for manufacturing the adhesion-resistant graphite fixture comprises the steps of treating a graphite substrate with a purifying gas such as chlorine gas at a temperature of about 1100° C. to remove impurities, depositing a coating of titanium carbide onto the graphite substrate under hydrogen atmosphere by reacting a volatile hydrocarbon and a titanium halide at the surface of the graphite substrate, and then depositing a coating of titanium nitride onto the titanium carbide coating under hydrogen atmosphere by reacting nitrogen and a titanium halide at the surface of the vapor deposited layer of titanium carbide.

The preferred volatile hydrocarbon is monochlorobenzene and the titanium halide is titanium tetrachloride. The titanium carbide coating is preferably from about 0.0001–0.0003 inches thick and the titanium nitride coating is typically from about 0.0003–0.0005 inches thick. These graphite fixtures are suitable for use with most currently used joining materials including, but not limited to solder, brazing compounds or materials and sealing glass.

DETAILED DESCRIPTION OF THE INVENTION

This invention is directed toward a fixture for maintaining components to be joined in proper orientation during a high temperature brazing or sealing process. Brazing is a process of joining metals with nonferrous filler metal having a melting point below that of the components to be joined. By definition of the American Welding Society, the filler metal must have a melting point above 800° F. (427° C.). The filler metal must be capable of wetting the surfaces to be joined without adhering to fixture surfaces used to support the components to be joined.

Brazing compound, when heated to a temperature above its melting point, flows by capillary action into small joint clearances between components to be joined. A limited amount of alloying may also occur at elevated temperatures between the filler and base metal. As a result, the strength of the brazed joint when properly made may exceed that of the base material. Strength of the brazed joint is attributed to three factors; atomic forces between the metals of the component interface, alloying which results from diffusion of the metal at the braze/component interface and intergranular penetration of the brazing alloy into the grain boundaries of the base metals being joined.

Four brazing processes that have achieved commercial importance are torch, induction, furnace and dip brazing. This invention focuses primarily on supplying fixturing for two types of furnace processes; the retort type having a controlled atmosphere and the vacuum type.

Retort-type furnaces are batch type furnaces in which the assemblies to be brazed are placed in a sealed retort prior to being placed into the furnace. After the air in the retort is purged by the furnace atmosphere gas, the retort is placed into the furnace and heated in a conventional manner.

The vacuum type, specifically the cold wall furnace, consists of a single vacuum chamber with thermal heating, insulation and electrical heating elements located inside the chamber. The vacuum chamber is usually water cooled. Suitable heat shields, typically made of multiple layers of molybdenum, tungsten, tantalum, graphite and other high temperature materials are placed between the heating elements and furnace walls to concentrate radiant heat on the work and prevent heat loss through the furnace walls. Temperatures of up to 4000° F. and pressures as low as $10^{-6}$ torr are possible although not typically used for fixture of electronic components.

Described more particularly herein is a fixture suitable for joining components having a composition which resists adherence to typically used joining materials.

Figure 1:
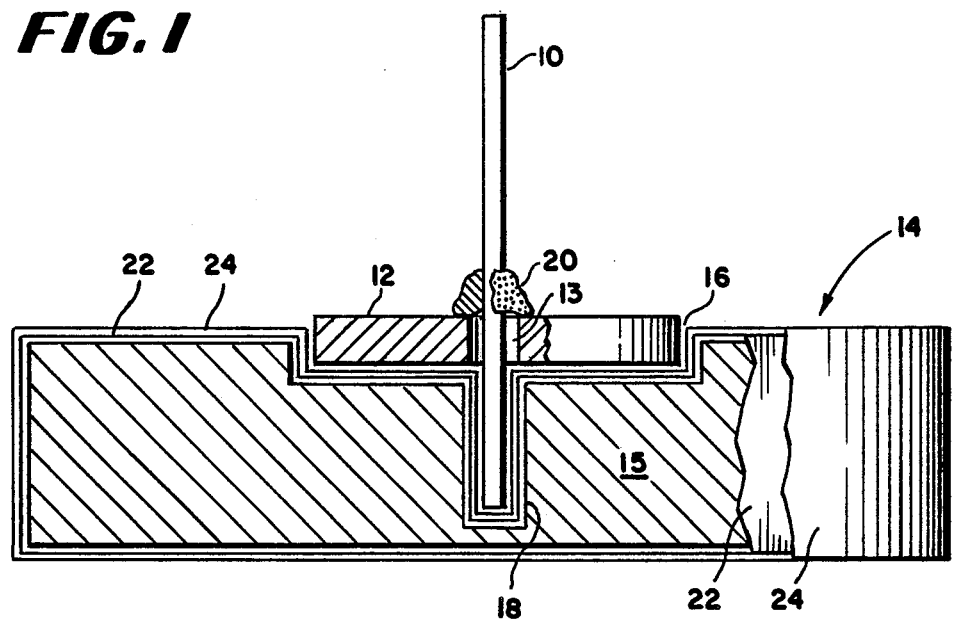
FIG. 1 is a schematic diagram of a titanium carbide/titanium nitride coated graphite fixture according to the present invention supporting an electronic assembly prior to the joining operation.

Component parts of an electronic assembly to be joined by brazing must be held in position by a fixture capable of maintaining proper orientation of the components during the joining process. By way of example, FIG. 1 depicts a fixture according to the present invention wherein two components, a wire conductor 10 and a metal or metalized component 12, are maintained in proper orientation in a graphite based fixture 14 which will be discussed in greater detail. Fixture 14 may be fabricated by techniques well known in the art to adapt the fixture to the structure of the components to be joined. For purposes of illustration, the fixture 14 has been machined to create a recess 16 for receiving a metal component 12. Component 12 possesses a central aperture or bore 13 though which wire conductor 10 is passed prior to sealing to metal component 12.

Metal plate 12 is placed into recess 16 in the top side of fixture 14 and wire conductor 10 is passed through the central aperture 13 in plate 12 and into a machined bore or recess 18 in fixture 14. The desired joining material 20, in this instance, a powdered insulative glass, is mounded around the wire conductor 10 on top of metal plate 12. The fixture, 14, plate 12, wire conductor 10 and insulating material 20 are then placed into a furnace (not shown) maintained under vacuum or under a reducing atmosphere and the furnace raised to a temperature above the melting point of the joining material 20.

Figure 2:
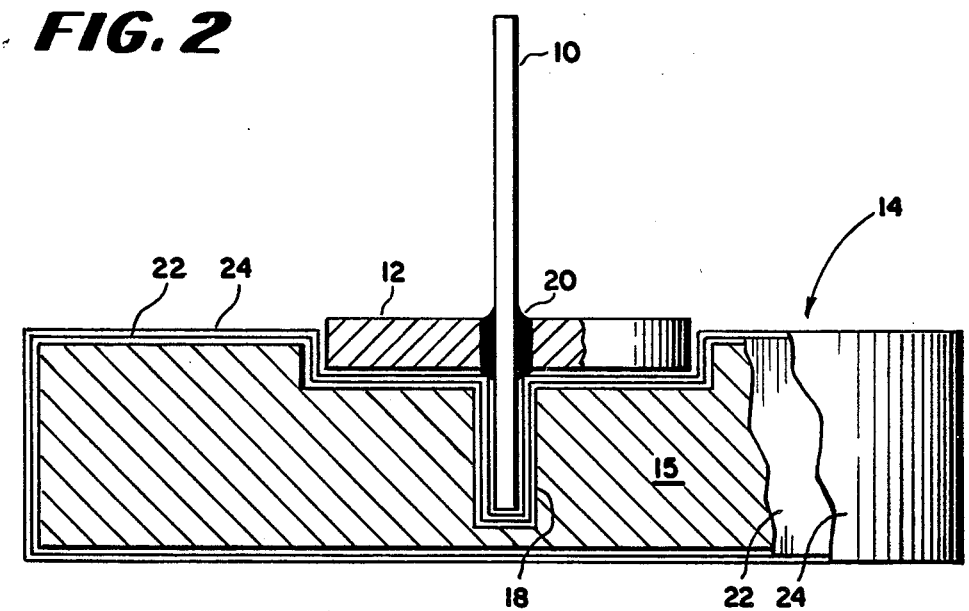
FIG. 2 is a schematic diagram of the device of FIG. 1 after the joining operation has been completed.

The joining material 20 melts and flows into the annular region between the central bore 13 of the metal plate 12 and the wire conductor 10 to join the two components and form an insulative seal as shown in FIG. 2. The fixture and joined components are cooled to room temperature and the joined components 10 and 12 are removed from fixture 14 for use.

Fixture 14 has a substrate 15 prepared from graphite. Desirable graphite substrate characteristics include high density and small grain size, high strength and a coefficient of thermal expansion approaching that of the coating materials to be applied to the substrate. Graphite suitable for practicing this invention can be purchased from Toyo Tanso under the name $SiC_6$. It should be noted that the coefficient of thermal expansion demonstrated by this material is rather high in comparison to other graphite materials available in the market. The following properties are illustrative of graphite substrates suitable for practicing this invention.

Density: 1.8–2.0 grams/cm$^3$
Grain size: 0.0001–0.0010 inches
Compressive strength: >10,000 psi
Flexural strength: >6,400 psi
Coefficient of thermal expansion: $(4.8–5.1) \times 10^{-6}$ cm/cm/°C.

In accordance with the present invention a composite coating is vapor phase deposited onto the surface of fixture 14, the coating comprising a layer of titanium carbide 22 over which is formed a contiguous layer or coating of titanium nitride 24. Both coatings may be advantageously formed in a continuous process using the same equipment. Fixtures according to the present invention exhibit extremely good wear characteristics and can be economically produced.

The device or fixture of the present invention is achieved by deposition of a continuous coating of titanium carbide 22 onto the graphite substrate 15. The titanium carbide layer may be deposited by any of the suitable processes known in the art. However, formation of a dense layer of titanium carbide onto a graphite surface requires considerable skill, equipment and technical ability. Prior to coating the graphite substrate, the substrate must be treated with a purifying gas, preferably chlorine gas at a temperature of about 2000° C. U.S. Pat. Nos. 3,874,900 and 3,684,585 which are specifically incorporated herein, discuss suitable methods for producing adherent coatings of titanium carbide onto metal and composite surfaces.

In contrast to known methods for coating metals with titanium carbide which require initial carburization of metal components to be joined, graphite does not require initial carbon enrichment of the substrate surface.

According to above-referenced U.S. Pat. No. 3,684,585, a uniform layer of titanium carbide may be deposited onto the graphite surface by vapor phase deposition using a volatile hydrocarbon and a titanium halide. Typically, a reactant gas containing hydrogen and monochlorobenzene is introduced into the deposition furnace containing the graphite substrate. Simultaneous to introduction of the hydrogen/monochlorobenzene mixture, a mixture of hydrogen and titanium tetrachloride ($TiCl_4$) is introduced into the furnace.

In a preferred embodiment, composition of the reactant gas entering into the furnace is approximately 0.75 to about 1.5 mole percent $TiCl_4$, from about 0.125 to about 0.25 mole percent monochlorobenzene and the remainder hydrogen. It is preferred that a sufficient amount of hydrocarbon be introduced into the stated gas composition range to maintain at least a stoichiometric ratio of carbon source to titanium in the reactant gas stream. Consequently a mole ratio of monochlorobenzene to $TiCl_4$ of about 1:6 should be used under these preferred conditions. Fixture temperature should be maintained between about 900° C. and about 1200° C. These condition allow for deposition of a uniform coating of titanium carbide onto the graphite surface at a rate from about 0.0002–0.0005 inches per hour. In a preferred embodiment the above described titanium carbide deposition process is allowed to proceed until from about 0.0001-0.0003 inches of titanium carbide is deposited onto the graphite surface.

Upon completion of the titanium carbide deposition step, the carbon source is discontinued and replaced with a flow of nitrogen. The flow of nitrogen and TiCl$_4$ is adjusted so the mixture contains enough nitrogen to provide stoichiometric quantities of nitrogen and titanium. In the preferred embodiment, sufficient nitrogen is utilized to form a gaseous mixture wherein the nitrogen is about two to about 10 times the amount required for a stoichiometric mixture of nitrogen and titanium. With the exception of the change in reactants, reaction conditions for the titanium carbide and titanium nitride deposition steps are substantially the same.

The vapor phase deposition is allowed to continue until an adherent, continuous coating of from about 0.0003-0.0005 inches of titanium nitride is formed over the titanium carbide coating 22. A thickness of 0.0005 inches is obtained in about 60 to about 150 minutes. This titanium nitride layer is adherently bonded to the titanium carbide layer and duplicates the physical characteristics of the original substrate surface. The overall thickness of the composite coating of titanium carbide and titanium nitride should not generally exceed from about 0.0008-0.001 inches so as to avoid delamination of the composite layer from the graphite substrate.

Having discussed the invention in detail, the following Example represents a typical method for preparing graphite fixtures of this invention.

EXAMPLE 1

A fixture substrate was prepared from graphite furnished by Toyo Tanso. The fixture was machined using conventional methods to form recesses and projections to hold components and joining material in the desired position for joining as shown in the drawing. The machined substrate was then purified at a temperature of 2000° C. with chlorine gas. The purified substrate was placed into a deposition reactor and heated to 1010° C. in a hydrogen atmosphere for 30 minutes. Titanium tetrachloride and a carbon source, monochlorobenzene, were introduced into the furnace under a hydrogen atmosphere causing a layer of titanium carbide to be deposited onto the surface of the graphite substrate. After deposition of a thickness of 0.0003 inches of titanium carbide, the carbon source was discontinued and replaced with a flow of nitrogen. A mole ratio of about (5-7) to 1 TiCl$_4$ to N$_2$ was reacted to deposit titanium nitride onto the substrate over the previously deposited titanium carbide layer. After deposition of 0.0003-0.0005 inches of titanium nitride, both reactant flows were discontinued and the reactor was purged with hydrogen and the cooled fixtures were removed from the reactor for use.

Titanium coated graphite fixtures of the claimed invention overcome existing obstacles associated with graphite fixtures in the electronic industry by substantially reducing particulate matter generated during use and minimizing contamination of components and joining material with particulates contributed by the fixture. Improved fixture and electronic component performance is achieved and the useful lifetime of the graphite fixtures is extended.

It will be observed that in the specific example cited, the titanium carbide coating is from about 0.0001-0.0003 inches thick and the titanium nitride coating from about 0.00003-0.0005 inches thick. However, the invention is not to be construed as limited to any particular thickness of each portion of the composite coating or the relative thicknesses of each layer. Those skilled in the art will recognize that composite layer thickness may be varied as desired or dictated by the specific use intended, relative cost of production and the like.

Having thus described the present invention, what is now deemed appropriate for Letters Patent of the United States is set out in the following appended claims.

What is claimed is:

1. A fixture for holding components to be joined by brazing which comprises a graphite substrate having a first layer of titanium carbide on at least a portion of the surface of the substrate and a second layer of titanium nitride overlaying said layer of titanium carbide.

2. The fixture according to claim 1 wherein said layer of titanium carbide has a thickness of about 0.0001 to 0.0003 inches and said titanium nitride layer has a thickness of about 0.0003-0.0005 inches.

3. The fixtures according to claim 1 wherein said graphite substrate has the following properties;
Density: 1.8-2.0 grams/cm$^3$
Grain size: 0.0001-0.0010 inches
Compressive strength: >10,000 psi
Flexural strength: >6,400 psi
Coefficient of thermal expansion: $(4.8-5.1) \times 10^{-6}$ cm/cm/°C.

4. A method of manufacturing a fixture for holding components to be joined by brazing comprising the steps of:
providing a graphite fixture suitable for a joining operation;
removing impurities from the surface of the graphite fixture by exposing said fixture to chlorine gas at a temperature of about 2000° C.;
depositing a coating of titanium carbide onto said graphite fixture under hydrogen atmosphere by reacting a volatile hydrocarbon and a titanium halide at the surface of said graphite fixture; and
depositing a coating of titanium nitride onto said coating of titanium carbide under hydrogen atmosphere by reacting nitrogen and a titanium halide at the surface of said titanium carbide.

5. The method of manufacturing a fixture according to claim 4, wherein the ratio of said volatile hydrocarbon and said titanium halide used during the deposition of said titanium carbide layer is at least 1:1.

6. The method of manufacturing a fixture according to claim 4, wherein the ratio of said volatile hydrocarbon and said titanium halide used during the deposition of said titanium carbide layer is about 2:1 to about 10:1.

7. The method of manufacturing a fixture according to claim 4, wherein said volatile hydrocarbon is monochlorobenzene and said titanium halide is titanium tetrachloride.

* * * * *